Nov. 14, 1933.          F. H. INMAN          1,935,449
ELECTRODE HOLDER
Filed July 29, 1932
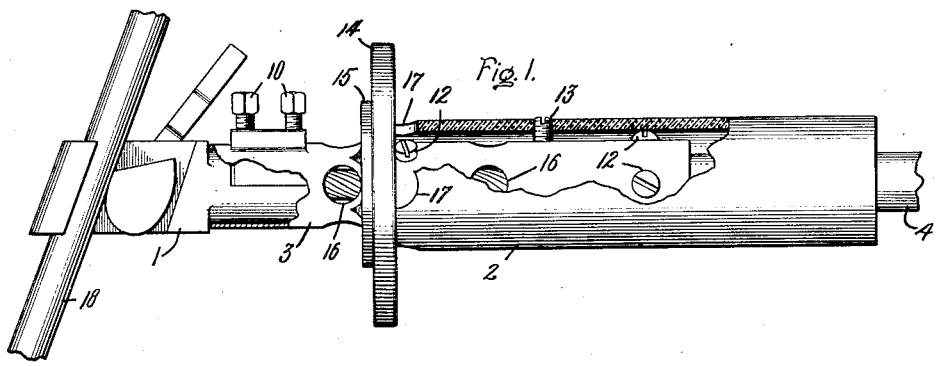
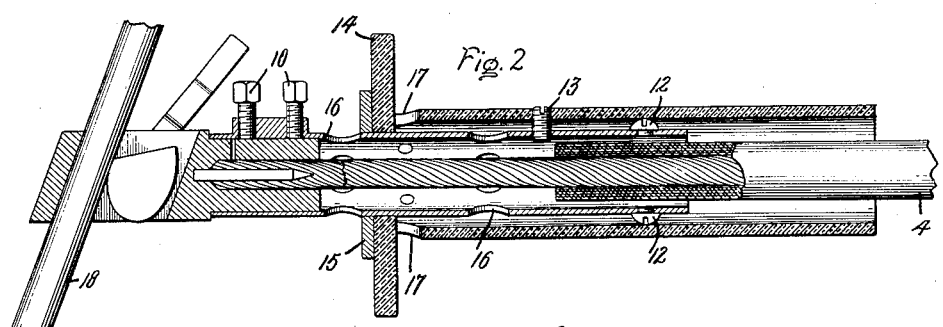
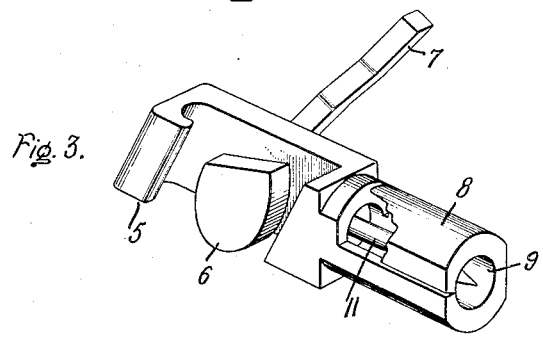
Inventor:
Fred H. Inman,
by Charles E. Mullan
His Attorney.

Patented Nov. 14, 1933

1,935,449

UNITED STATES PATENT OFFICE 1,935,449

ELECTRODE HOLDER

Fred H. Inman, Schenectady, N. Y., assignor to General Electric Company, a corporation of New York Application July 29, 1932. Serial No. 626,016

5 Claims. (Cl. 219—8)

My invention relates to electrode holders for arc welding wherein a welding arc is maintained between the work and an electrode secured in the holder, the electrode being connected to one terminal of a suitable source of welding current through the agency of the electrode holder and the work being connected to the other terminal of said source.

It is an object of my invention to provide an electrode holder of improved construction.

It is a further object of my invention to provide an electrode holder which is so constructed that the handle remains cool during welding.

It is a further object of my invention to provide an electrode holder in which the electrode clamp is mechanically secured in the holder and to the terminal of an electrical conductor by means of which welding current is supplied thereto by a single means.

Further objects of my invention will become apparent from the following description taken in connection with the accompanying drawing in which Fig. 1 is a side view partly in section of an electrode holder in accordance with my invention, Fig. 2 of which is a sectional view of the electrode holder shown in Fig. 1, and Fig. 3 of which is a perspective view of the electrode clamp which forms a part of the electrode holder.

The electrode holder comprises an electrode clamp 1, a handle 2 and a hollow supporting member 3 to the opposite ends of which the clamp and handle are attached. Current is supplied to the electrode clamp through a conductor 4 which extends thereto through the handle 2 and supporting member 3.

As shown in Fig. 3, the electrode clamp comprises a jaw 5 against which the electrode is held by a cam 6 which is operated by a lever 7. The electrode clamp is provided with a slotted shank 8 which includes a socket 9 into which the bared terminal of the conductor 4 extends and in which it is held in place by set screws 10 which also serve at the same time to hold the electrode clamp in position in the portion of the supporting member 3 which projects beyond the handle 2. A pin 11 may be provided in the socket 9 to facilitate a good electrical connection between the terminal of the conductor 4 and the electrode clamp.

The handle 2 is mounted in spaced relationship on its supporting member 3. In the particular arrangement illustrated this spacing is accomplished by means of screws 12, the heads of which separate the internal surface of the handle 2 from the external surface of the supporting member 3. The handle 2 may be held in position on the supporting member 3 by a set screw 13. The handle 12 is made of fibre or some other insulating material, and the set screw 13 is also preferably made of some insulating material, although this is not necessary if the supporting member 3 be made in part or wholly of an insulating material.

The electrode holder may be provided with a guard 14. If so provided, it is preferably mounted on the supporting member 3 and held in position thereon against a washer 15 by means of the handle 2. The washer 15 may be attached to the supporting member 3 by welding or by some other suitable mechanical arrangement.

The supporting member 3 is provided with ventilating openings 16 which are spaced relative to one another so as to restrict the transfer of heat from the electrode clamp to the handle of the holder. Preferably these ventilating openings are provided on each side of the guard 14 so as to provide for the circulation of air through the supporting member and the handle supported thereon. By spacing the handle 2 from the guard 14 by providing opening 17 therein, provision is also made for the circulation of air between the handle 2 and its support 3. Preferably, the insulating material is removed from a considerable portion of the terminal of the welding conductor 4 to expose it to the cooling effect of the air circulating through the supporting member 3 by way of openings 16.

Preferably the electrode clamp is made as compact as possible, and of a material having a high electrical conductivity so that the heat generated therein due to the flow of welding current to the electrode is minimized. The jaw 5 of the electrode clamp is also preferably of large dimensions to permit an extended contact between it and the electrode 18 which decreases the heating effect due to contact resistance between the electrode and the electrode clamp. The flow of any heat generated in the electrode clamp, due to the flow of welding current therethrough or the heat of the welding arc transmitted thereto during welding is effectively restricted, however, by the ventilating openings 16 which also permit a circulation of air through and about the handle of the electrode holder, as well as the terminal portion of the welding conductor, and thus maintain the electrode holder at a low temperature during welding even when using heavy current values.

While I have shown and described a particular embodiment of my invention, it is to be understood that modified arrangements may be provided without departing from the spirit and scope of my invention.

What I claim as new and desire to secure by Letters Patent of the United States is:

1. An electrode holder comprising a handle, a hollow supporting member therefor projecting beyond said handle, an electrode clamp attached to the projecting end of said member, and means for connecting to said electrode clamp the bared terminal of an electrical conductor extending through said handle and through said supporting member.

2. An electrode holder comprising a handle, a hollow supporting member therefor projecting beyond said handle, an electrode clamp, and means for simultaneously attaching said electrode clamp to the projecting end of said holder and to the bared terminal of a conductor extending through said handle and said supporting member.

3. An electrode holder comprising a hollow supporting member, a handle attached to one end of said member, an electrode clamp having a slotted shank provided with a socket for an electrical conductor, and means for simultaneously clamping said shank in the other end of said member and the terminal of an electrical conductor extending through said handle and said support in the socket in said shank.

4. An electrode holder comprising a hollow supporting member having a plurality of ventilating openings arranged relatively to one another to restrict the transfer of heat from one end of said member to the other end thereof, an electrode clamp attached to one end of said member, a handle supported on the other end of said member in spaced relationship thereto, and means for connecting to said electrode clamp the bared terminal of an electrical conductor extending through said handle and said supporting member.

5. An electrode holder comprising a hollow supporting member having a plurality of ventilating openings arranged relatively to one another to restrict the transfer of heat from one end of said member to the other end thereof, an electrode clamp attached to one end of said member, a guard supported on said member intermediate said ventilating openings, a handle supported on the other end of said member in spaced relationship thereto and to said guard, and means for connecting to said electrode clamp the bared terminal of an electrical conductor extending through said handle and said supporting member.

FRED H. INMAN.